(12) United States Patent
Hsieh (10) Patent No.: US 6,854,880 B2
(45) Date of Patent: Feb. 15, 2005

(54) ELECTRONIC CLINICAL THERMOMETER (75) Inventor: Chih-Wei Hsieh, Chi Pei (TW)

(73) Assignee: Actherm Inc., Hsinchu Hsien (TW)

(*) Notice: Subject to any disclaimer, the term of this patent is extended or adjusted under 35 U.S.C. 154(b) by 0 days.

(21) Appl. No.: 10/728,972

(22) Filed: Dec. 8, 2003

(65) Prior Publication Data
US 2004/0114668 A1 Jun. 17, 2004

Related U.S. Application Data (63) Continuation of application No. 10/309,028, filed on Dec. 4, 2002.

(30) Foreign Application Priority Data

Jun. 27, 2003 (TW) ........................ 92117527 A (51) Int. Cl.⁷ .............................. G01K 1/14; G01K 7/00
(52) U.S. Cl. ........................ 374/163; 374/158; 374/208
(58) Field of Search ................................ 374/163, 208, 374/158, 170, 183; D10/57; 600/474

(56) References Cited

U.S. PATENT DOCUMENTS

| 4,444,517 A | * | 4/1984 | Murase | 374/188 |
|---|---|---|---|---|
| 4,614,442 A | * | 9/1986 | Poncy | 374/158 |
| 4,729,672 A | * | 3/1988 | Takagi | 374/208 |
| 5,013,161 A | * | 5/1991 | Zaragoza et al. | 374/208 |
| 5,165,798 A | * | 11/1992 | Watanabe | 374/208 |
| 5,829,878 A | * | 11/1998 | Weiss et al. | 374/163 |
| 6,068,399 A | * | 5/2000 | Tseng | 374/163 |
| 6,406,182 B1 | * | 6/2002 | Chen | 374/208 |
| 2004/0105487 A1 | * | 6/2004 | Chen | 374/163 |

FOREIGN PATENT DOCUMENTS

| EP | 0458420 A2 | * | 5/1991 | .......... G01K/13/00 |
|---|---|---|---|---|
| JP | 06139869 A | * | 5/1994 | .......... H01H/13/04 |
| JP | 10221176 A | * | 8/1998 | ............ G01K/7/00 |
| WO | WO0216899 A1 | * | 2/2002 | .......... G01K/13/00 |

* cited by examiner

*Primary Examiner*—Gail Verbitsky
(74) *Attorney, Agent, or Firm*—Leong C. Lei (57) ABSTRACT

An electronic thermometer is constructed to include a casing, an electronic thermometer module mounted in the casing, a metal probe electrically connected to the electronic thermometer module for sensing the body temperature, an integrally formed flexible covering covered on the casing, and a hard stem connecting the metal probe to the distal end of the tapered front portion of the flexible covering, whereby the stress produced at the time when the measuring end is bent for measuring body temperature will be concentrated at a root portion with a larger inner diameter thereby preventing the measuring end from breaking and ensuring safety in operation. Furthermore, the flexible covering appropriately encloses the casing and has a tapered front portion protruded over the front side of the casing to a distance and has an integrally formed push button, locating flange, and embossed portions for waterproof, decoration and holding convenience thereby reducing manufacturing process and lowering the cost.

5 Claims, 10 Drawing Sheets

( prior art )

ELECTRONIC CLINICAL THERMOMETER

CROSS-REFERENCE

This is a continuation of the pending patent application Ser. No. 10/309,028, filed Dec. 4, 2002.

BACKGROUND OF THE INVENTION

1. Field of the Invention

This invention is related to an electronic clinical thermometer with a flexible structure, and in particular to one which comprises a flexible covering having a probing portion, and a hard stem having an appropriate length and connecting the metal probe to the distal end of the probing portion of the flexible covering, so that the probing portion will not break even if the probing portion is bent for measuring operation many times, thereby ensuring safety in use and wherein the flexible covering appropriately encloses the casing and has a waterproof push button, locating flange and embossed portion for turning on/off the switch when the flexible push button is depressed by the user and for making the clinical thermometer waterproof, appealing in appearance, facile to fabricate, easy to hold, simple to process, and low in cost. Further, the casing of the clinical thermometer may be made of transparent material and appropriately enclosed with a flexible covering for facilitating holding of the thermometer and providing a transparent window for viewing the temperature reading.

2. Description of the Related Art

Conventional electronic thermometers commonly have a hard casing formed from plastics and a metal probe at the tapered front end of the hard casing. Because the tapered front end of a conventional electronic thermometer is not flexible, the user must use the thermometer carefully, to prevent a break from occurring in the connection area between the casing and the metal probe. In order to eliminate this problem, electronic thermometers with a flexible probing structure have been developed. The flexible probing structure is generally made of rubber material so that the probe can be bent in use as required. However, these electronic thermometers suffer from drawbacks such as insufficient structural strength and being unsanitary. Furthermore, the conventional electronic thermometer is generally complicated in manufacture and expensive in cost.

Figure 1:
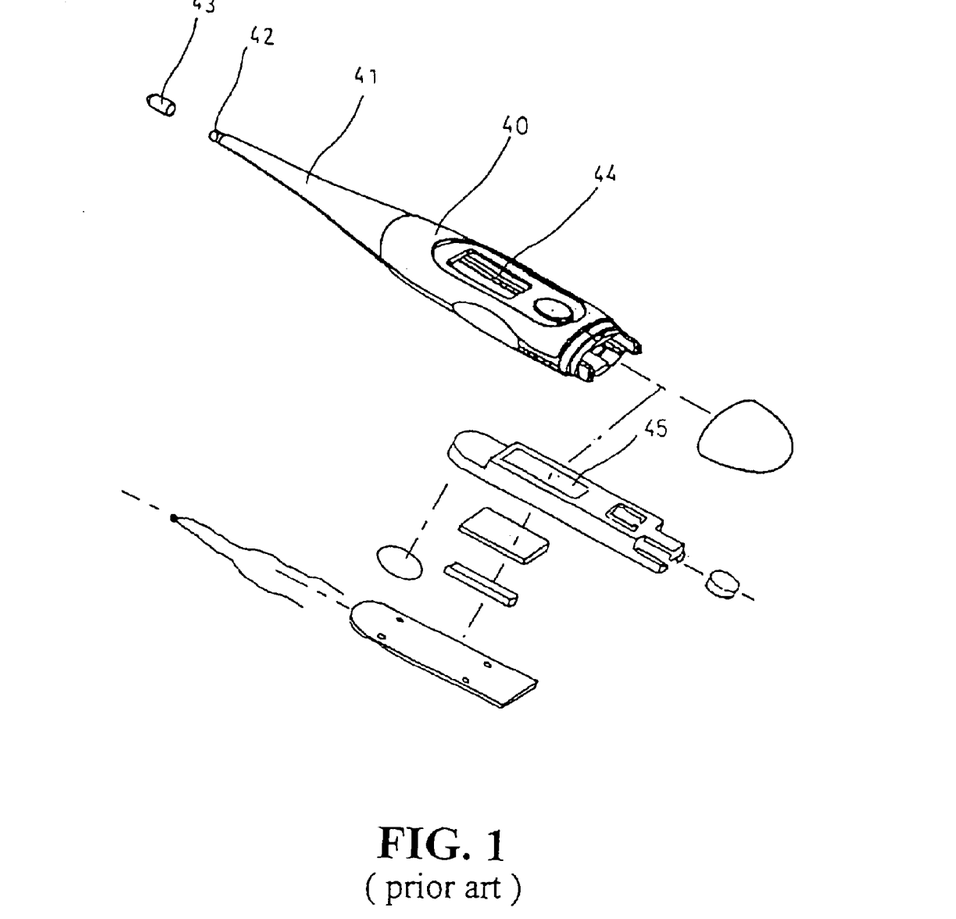
FIG. 1 is an exploded view of an exploded view of a flexible electronic thermometer according to Taiwan Patent Publication No. 495024.
Figure 2:
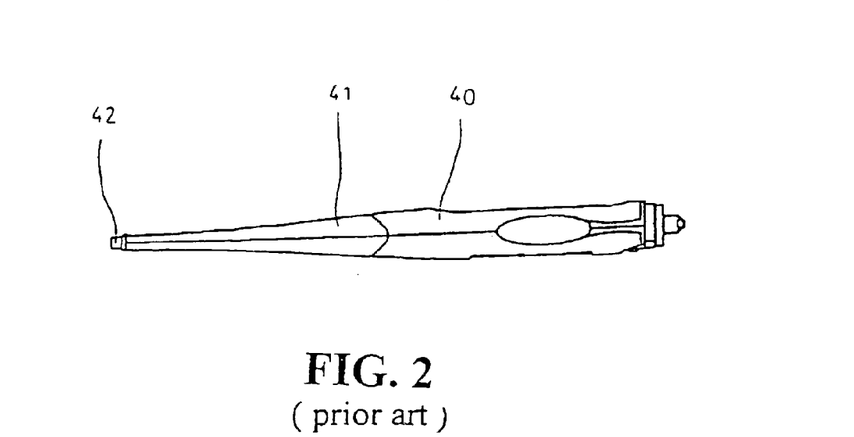
FIG. 2 is a side view of the flexible electronic thermometer shown in FIG. 1.

FIGS. 1 and 2 show an electronic thermometer constructed according to Taiwan Patent Publication No. 495024 entitled "Improvement in the structure of a flexible electronic thermometer". As illustrated, this electronic thermometer comprises a casing 40 having a probing portion 41 at the front section and a tubular member 42 formed of hard plastics and fitted in the interior of the front end of the probing portion 41, thereby enabling a metal sensor 43 to be fitted in the probing portion 41.

Figure 3:
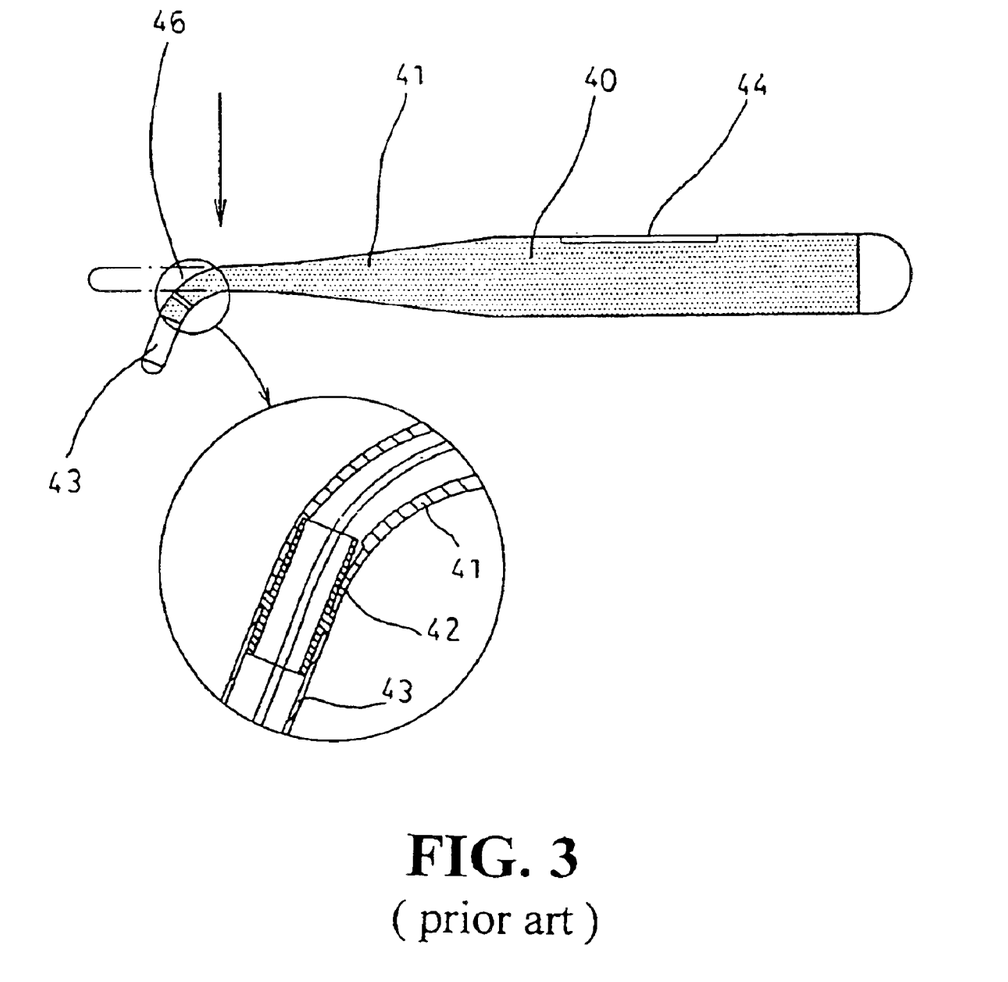
FIG. 3 is a schematic drawing showing the front end of the flexible electronic thermometer of FIG. 1 curved during a measuring action.

Referring to FIG. 3, when probing portion 41 of the casing 40 is curved for use in measuring temperatures, if the probing portion 41 is made of flexible material such as rubber, stress will be concentrated at the connection portion 46 between the tubular member 42 and the probing portion 41 because the tubular member 42 will apply a pressure to the flexible probing portion 41 thereby continually concentrating stress at the connection portion 46 after it has been bent a number of times, and therefore causing a tendency to break the connection portion 46. It is obvious that such a thermometer does not have sufficient strength in structure and is not safe in use.

Further, if the probing portion 41 is made of flexible material, particularly rubber, which is low in density, the probing portion 41 will have a rough surface which can easily become covered with dirt particles. It is extremely difficult to remove the particles from the rough surface thereby causing sanitary problems.

With further reference to FIGS. 1 and 2, the probing portion 41 is engaged only with the casing 40 of the thermometer (which is generally made of hard material) and does not enclose the casing 40 partially or wholly, so that the probing portion 41 is only connected to a portion of the front end of the casing 40. As a consequence, the connection area between the probing portion 41 and the casing 40 is too small to provide a sturdy engagement. Hence, if the casing 40 is enclosed partially or wholly by the probing portion 41, then the engagement between the casing 40 and the probing portion 41 will be strengthened.

Moreover, the casing 40 suffers from other drawbacks: for example, the casing 40 is made of opaque material and so it is necessary to form an opening 44 on the top of the casing 40 in order for viewing the liquid crystal display 45 of the circuit board inside the casing 40. Moreover, the casing 40 does not have any raised lines for facilitating the holding of the thermometer and is boring in appearance. Furthermore, a resilient packing ring is required to be mounted between the cap and the rear end of the casing 40 in order to prevent water from entering into the casing 40 thus making the manufacturing process complicated and increasing the cost.

In conclusion, as the flexible probing portion 41 is connected only to the front end of the casing 40 and does not enclose the casing 40 and does not have integrally formed raised lines and a water-proof packing ring, the probing portion 41 cannot be firmly engaged with the casing 40 and the manufacturing is made complicated and the cost is increased.

Figure 4:
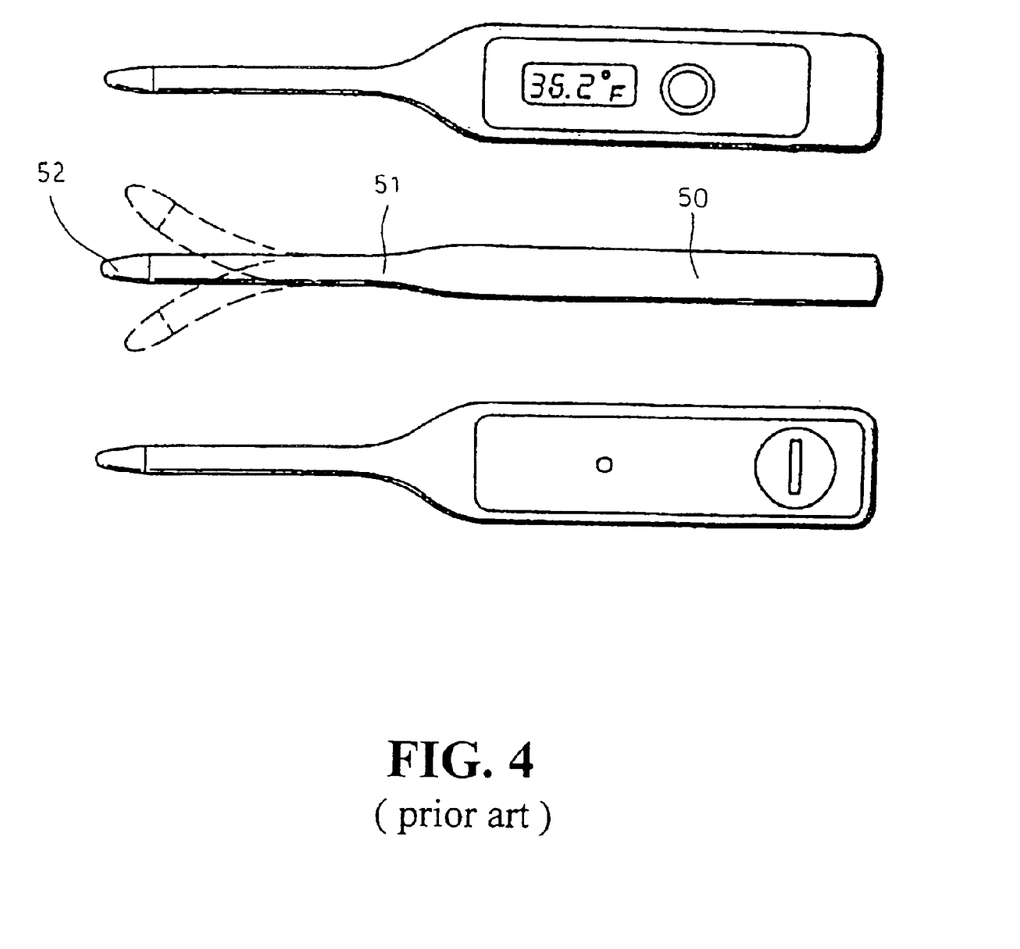
FIG. 4 is a schematic drawing showing the soft flexible casing of the electronic clinical thermometer curved according to U.S. Pat. No. 5,165,798.

FIG. 4 shows an electronic clinical thermometer according to U.S. Pat. No. 5,165,798. The electronic clinical thermometer has a similar casing 50 and a flexible portion 51 forwardly extended from the casing 50 and terminating in a metal probe 52. However, the electronic clinical thermometer suffers from the same drawbacks as the aforesaid Taiwan Patent Publication No. 495024. Furthermore, the electronic clinical thermometer is very complicated in structure.

Figure 5:
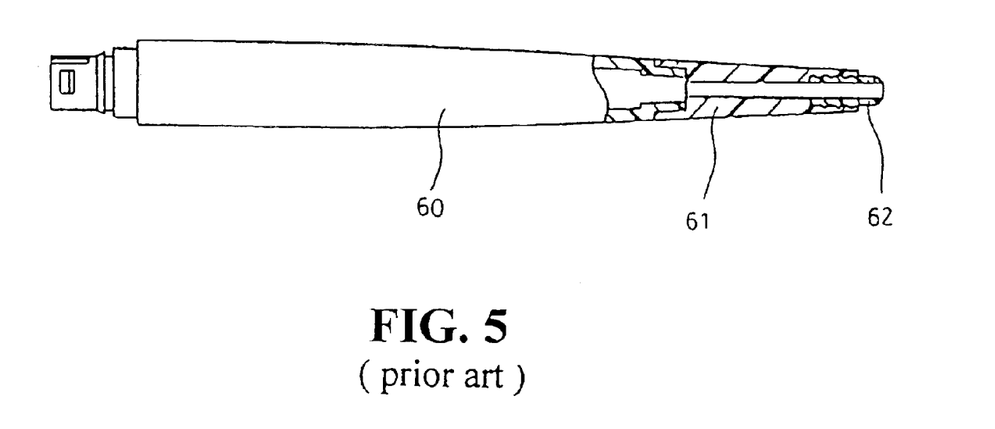
FIG. 5 is a schematic sectional view of the cost-effective electronic thermometer according to U.S. Pat. No. 6,379,039.
Figure 6:
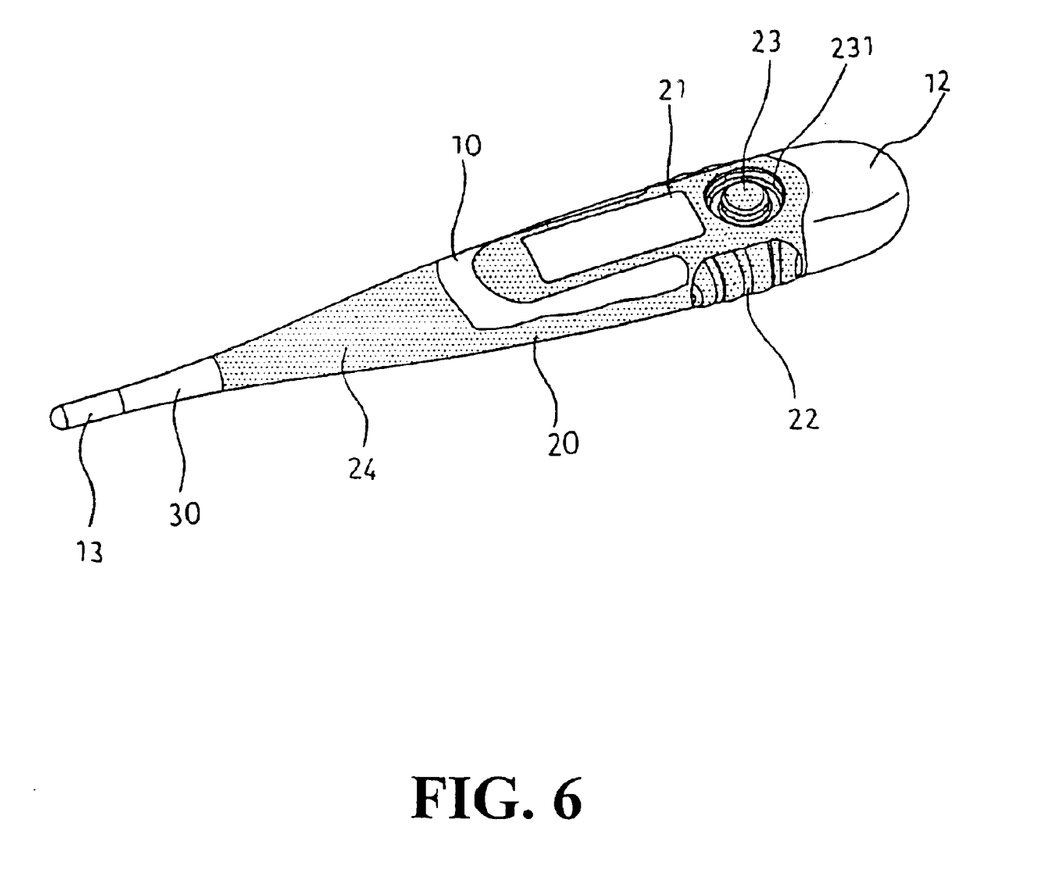
FIG. 6 is an elevational view of an electronic thermometer according to the present invention.
Figure 7:
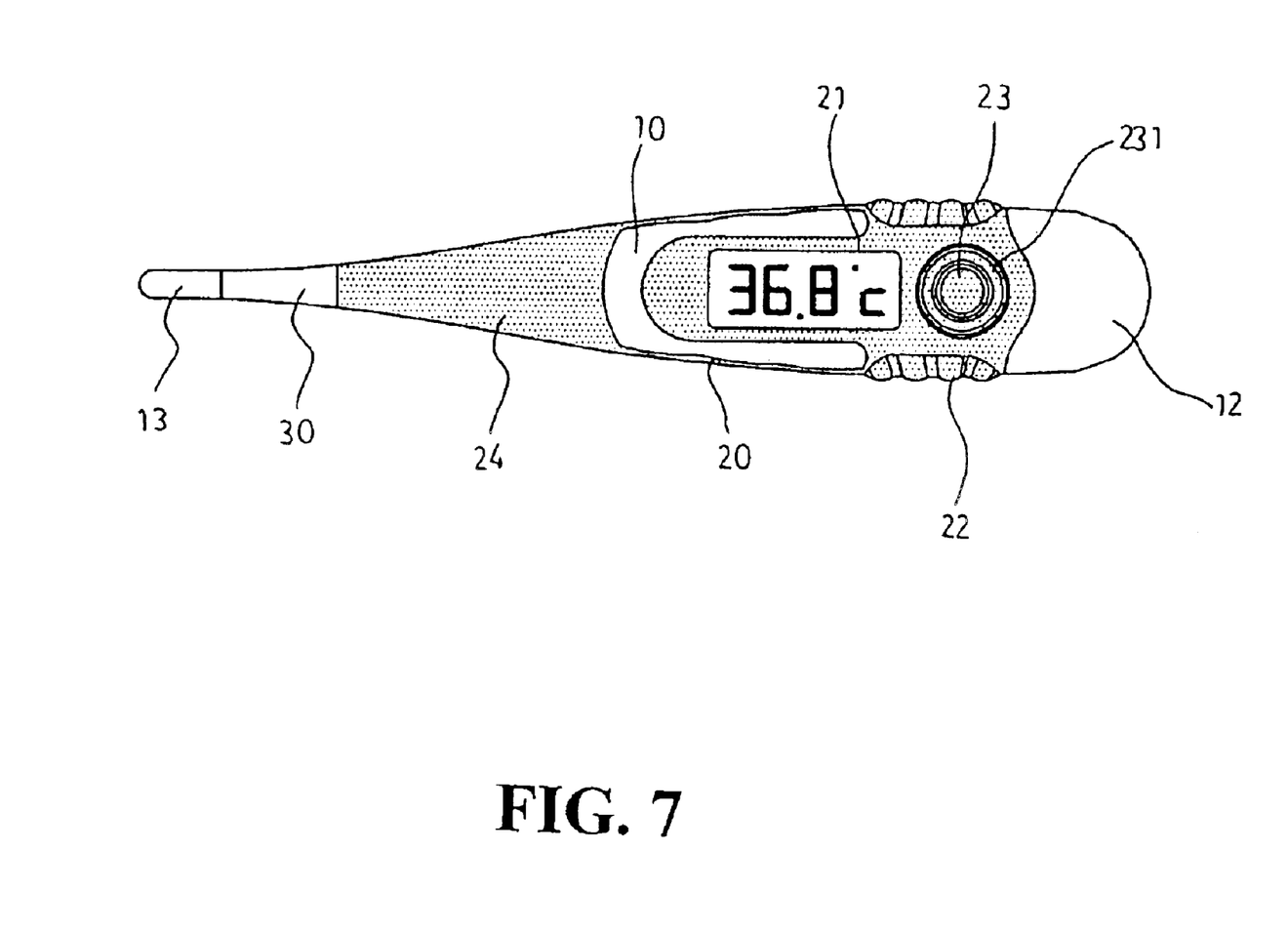
FIG. 7 is a top view of the electronic thermometer according to the present invention.
Figure 8:
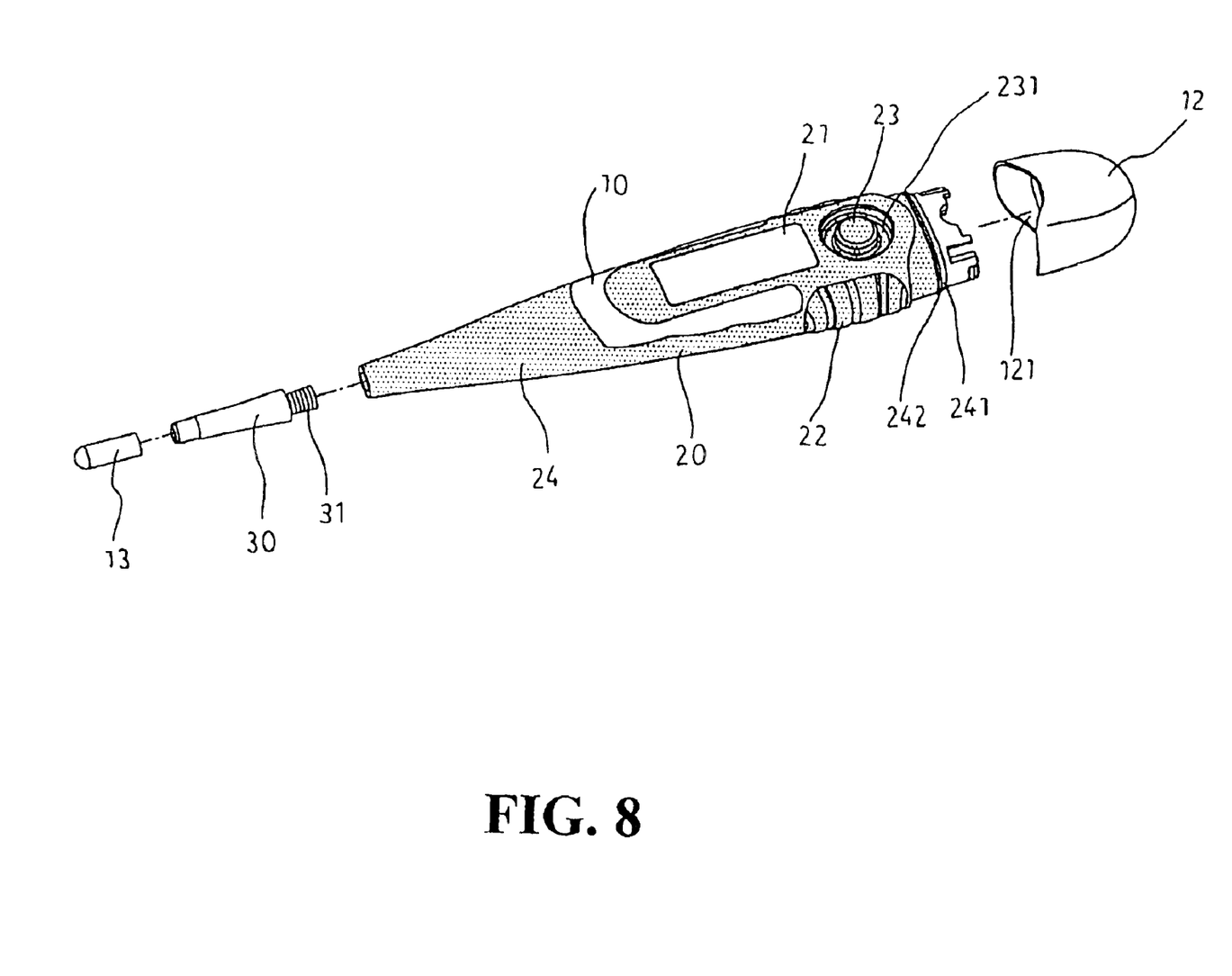
FIG. 8 is an exploded view of the electronic thermometer according to the present invention.
Figure 9:
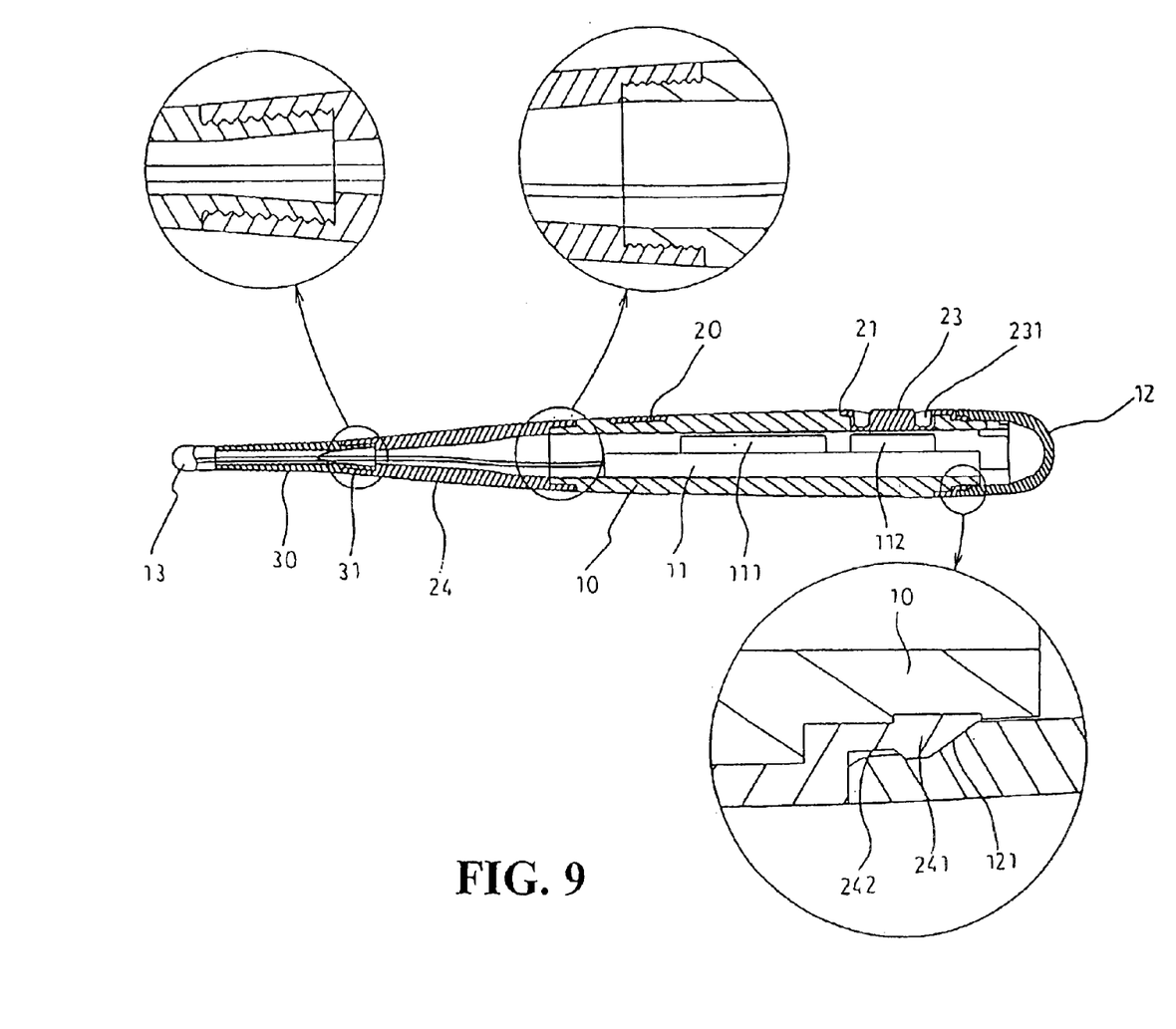
FIG. 9 is a sectional view of the electronic thermometer according to the present invention.

FIG. 5 shows an electronic thermometer constructed according to U.S. Pat. No. 6,379,039. The electronic thermometer comprises a casing 60, a probing portion 61 extended from a front end of the casing 60, a connection member 62 provided at the front end of the connection member 62 to hold a metal probe (not shown).

However, the electronic thermometer suffers from the same drawbacks as the Taiwan Patent Publication No. 495024. The connection member 62 is also short in length, and fitted in the interior of the front end of the probing portion 61. After the probing portion 61 has been bent for use in measuring temperatures a number of times, there is a tendency for the connection portion to break Hence, such a thermometer does not have sufficient strength and is not safe in use either. The probing portion 61 is made of soft material and has a rough surface which allows dirt particles to settle into the material and which are difficult to remove.

Referring to FIG. 5 again, the probing portion 61 made of flexible material is connected only to the front end of the casing 60 (which is generally made of hard material) and does not enclose the casing 60 wholly or partially, so that the probing portion 61 is only connected to a portion of the front end of the casing 60. As a consequence, the connection area between the probing portion 61 and the casing 60 is too small to provide a sturdy engagement therefor. Hence, if the casing 60 is enclosed partially or wholly by the probing portion 61, then the engagement between the casing 60 and the probing portion 61 will be strengthened.

Moreover, the casing 60 suffers from other drawbacks: for example, the casing 60 is made of opaque material and so it is necessary to form an opening on the top of the casing 60 in order to view the liquid crystal display. In addition, the casing 60 does not have any raised lines for facilitating the holding of the thermometer and is boring in appearance. Furthermore, a resilient packing ring is required to be mounted between the cap and the rear end of the casing 60 in order to prevent water from entering into the casing 60 thus making the manufacturing process complicated and increasing the cost.

In conclusion, as the flexible probing portion 61 is connected only to the front end of the casing 60 and does not enclose the casing 60 and does not have integrally formed raised lines and a water-proof packing ring, the probing portion 61 cannot be firmly engaged with the casing 60 and the manufacturing is made complicated and the cost is increased.

Furthermore, some conventional electronic thermometers have a flexible push button for a waterproof switch which is a film member (some have an additional switch). Although the push button can deform in the pressing operation, as the deformation of the button is minimal and the switch within the thermometer small, it is necessary to have a rigid key portion provided below the flexible push button for turning on/off the switch when the flexible push button is depressed by the user. The arrangement of the rigid key portion greatly increases the manufacturing cost of the electronic thermometer. Therefore, it is an object of the present invention to provide an improved electronic thermometer which can obviate and mitigate the above-mentioned drawbacks.

SUMMARY OF THE INVENTION

It is the primary object of the present invention to provide a clinical thermometer having a flexible probing portion which is sanitary in use and will not break even if it is bent for use many times in measuring operations, wherein the clinical thermometer comprises a flexible casing, a probing portion extended from an end of the flexible casing, and a hard stem (made of hard plastics) to connect with a metal probe, so that the stress will be concentrated at the root of the probing portion with the biggest inner diameter of the flexible covering, thus providing a strong structure and safety for the probing portion and wherein the hard stem has a smooth outer surface to prevent dirt particles from adhering easily to the hard stem and to enable the particles to be removed easily thus keeping it in a sanitary condition.

It is another object of the present invention to provide a clinical thermometer which is simple in manufacturing and low in cost, wherein an integrally formed flexible covering extends from the front end to the rear end of the casing thereby appropriately covering the casing, the flexible covering having a push button integrally formed with the flexible covering for pressing by a finger to turn on/off the switch means of the electronic thermometer module and a groove extended around the push button for enabling the push button to be easily deformed to turn on/off the switch without the assistance of a hard member, and the casing having a locating flange integrally formed with the casing and extended around the periphery near the rear side to provide a waterproof function, thereby facilitating the manufacturing process and decreasing the cost.

It is still another object of the present invention to provide a clinical thermometer wherein the casing is formed from transparent material and appropriately covered with a flexible covering which has an opening to provide the casing with a window for viewing a liquid crystal display.

It is still another object of the present invention to provide an improved clinical thermometer wherein said casing has two embossed portions integrally formed with said casing and symmetrically provided at two sides thereof for enabling the user's fingers to hold the electronic thermometer.

It is a further object of the present invention to provide an improved clinical thermometer wherein an integrally formed flexible covering is extending from the front end to the rear end of the casing to appropriately cover the casing thereby increasing the connection area and strengthening the engagement thereof The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 6~9, the electronic thermometer in accordance with the present invention comprises a casing 10, a circuit board 11 provided inside the casing 10 for measuring temperatures, a cap 12 provided at the rear end of the casing 10, and a metal probe 13 provided at the front end of the casing 10.

The casing 10 is formed from transparent material and covered with a flexible covering 20 (for example, rubber). The flexible covering 20 extends from the front end to the rear end of the casing 10 and is integrally made thereby increasing the connection area with the casing 10 and strengthening the engagement therebetween. The flexible covering 20 has a sealing flange 241 with a skew edge which is integrally formed with the flexible covering 10 and extended around the periphery near the rear side, and a locating groove 242 extended around the periphery adjacent to the sealing flange 241. The cap 12 has an inside engagement portion 121 fitting the sealing flange 241 and a locating groove 242 of the flexible covering 20. When the cap 12 is placed on the rear end of the casing 10, the engagement portion 121 is forced over the sealing flange 241 into watertight engagement with the locating groove 242 of the flexible covering 10.

The flexible covering 20 has an opening 21 corresponding to the liquid crystal display 111 of the circuit board 11, so that the casing 10 has a transparent window for viewing the temperature shown in the liquid crystal display 111.

Two embossed portions 22 are symmetrically provided at two sides of the casing 10 and integrally formed with the flexible covering 20 for the resting of the fingers to hold the electronic thermometer and for decorating the casing 10.

A push button 23 is integrally formed with the flexible covering 20 and designed for preventing water from entering into the casing 10 and for the pressing of the finger on the push button to turn on/off the switch 112 of the circuit board 1. A groove 231 is extended around the push button 23 for enabling the push button 23 to be easily deformed, without the assistance of a rigid member, to turn on/off the switch 112 of the circuit board 1 when the push button 23 is pressed by the finger, thereby reducing the manufacturing cost.

The flexible covering 20 encloses the casing 10 and has a probing portion 24 extended in a tapered manner from the end of thereof. A hard stem 30 formed from, for example, hard plastics, is connected between the probing portion 24 of the flexible covering 20 of the casing 10 and the metal probe 13. The hard stem 30 has a threaded neck 31 extended from the rear end and threaded into the distal end of the probing portion 24 of the flexible covering 20 of the casing 10 so as to strengthen the engagement. Similarly, the flexible covering 20 may be formed with internal threads (or external threads) to engage with external threads (or internal threads) of the casing 10.

Figure 10:
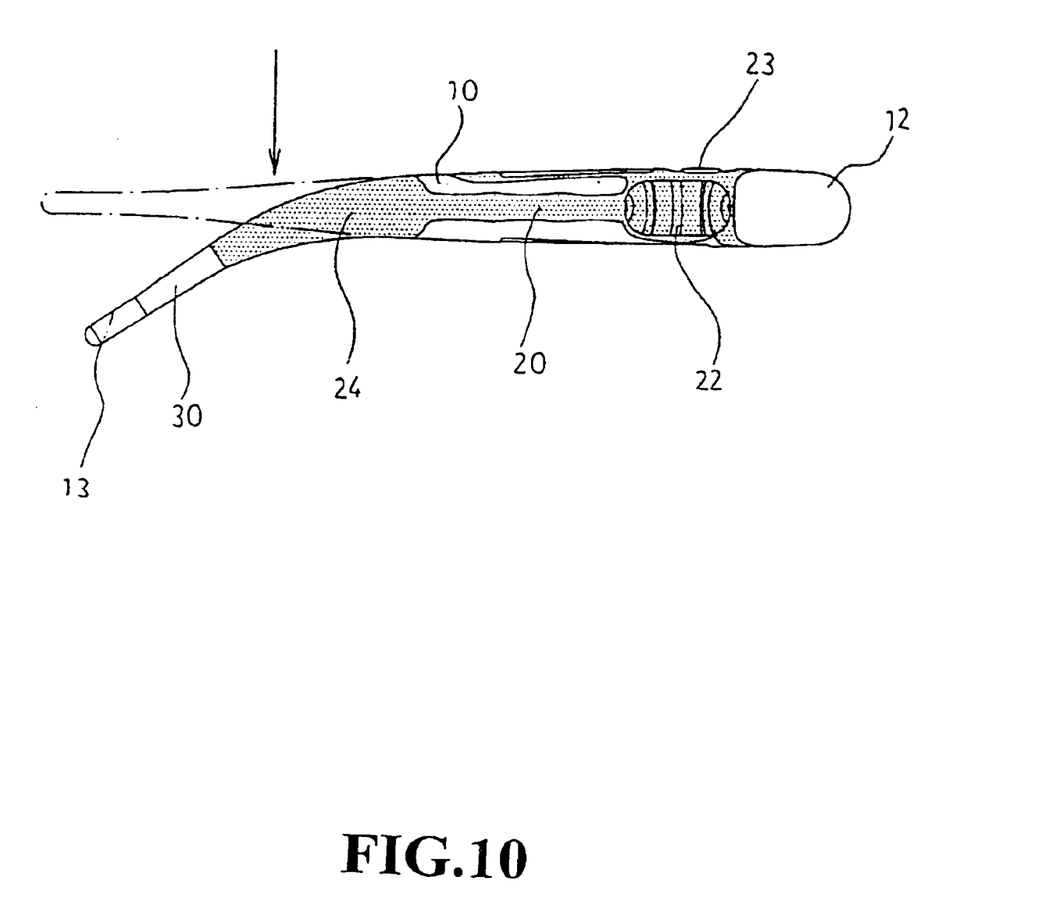
FIG. 10 is a schematic drawing showing the tapered front portion of the electronic thermometer curved during a measuring action.

Referring to FIG. 10, when the probing portion 24 of the flexible covering 20 is bent for measuring temperatures, because the hard stem 30 has a certain length, the stress will be concentrated at the root of the probing portion 24 with the biggest inner diameter of the flexible covering 20. Therefore, the probing portion 24 will not break even if it has been bent for use in measuring temperatures many times, thereby making it safe to use. Moreover, the hard stem 30 has a smooth outer surface, so that dirt particles cannot not easily adhere to the hard stem 30, and the user can easily remove any grit from the hard stem 30 thus keeping it in a sanitary condition.

Figure 11:
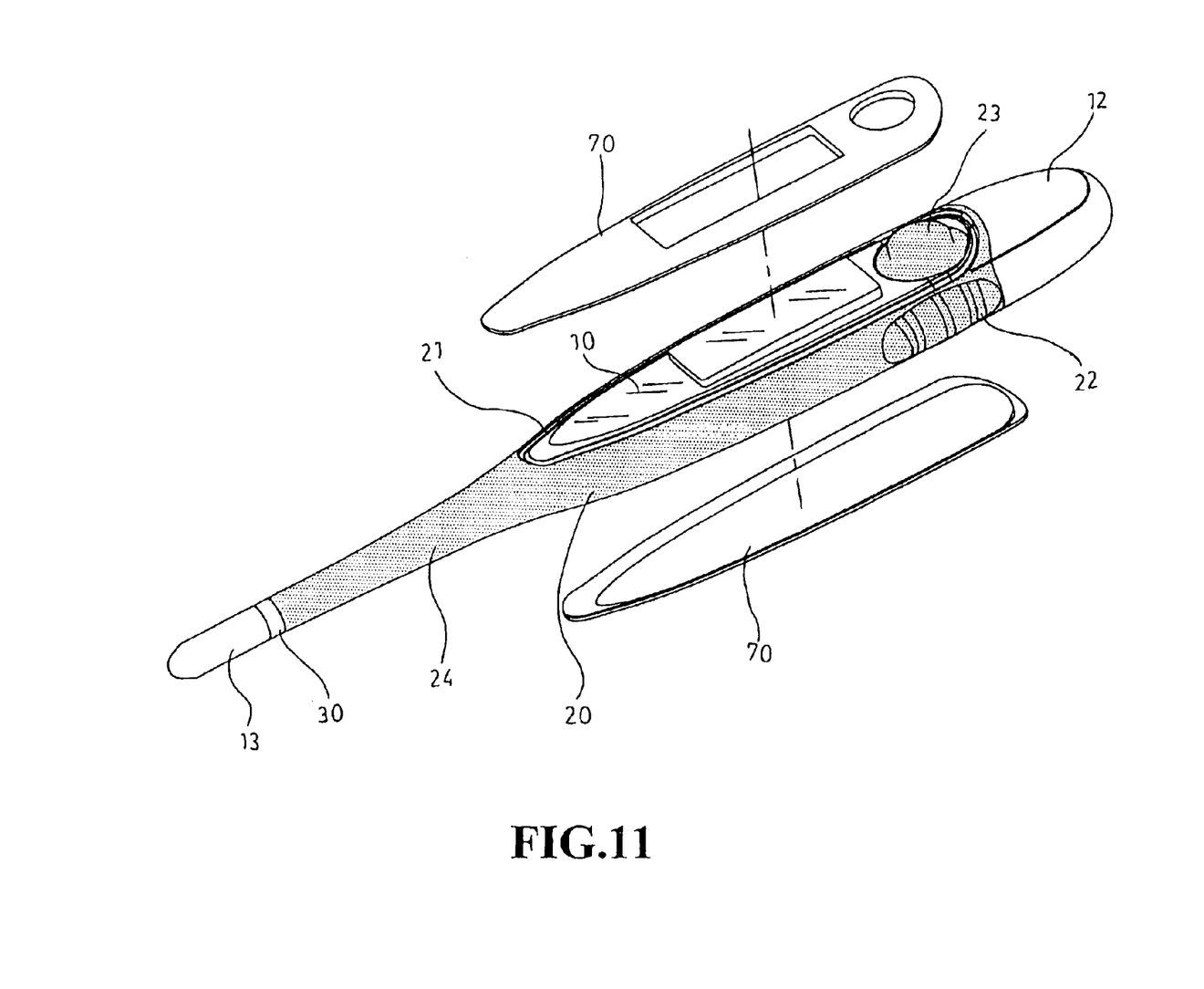
FIG. 11 is an exploded view of another preferred embodiment according to the present invention.

Referring to FIG. 11, the casing 10 may be made of transparent material and the flexible covering 20 on the casing 10 is formed with two recesses 21, one on the top and the other on the bottom, thereby naturally providing a window for viewing temperature shown on the display. Two panels 70 are force-fitted in the recesses 21 to hold the push button 23 in position on the one hand and decreasing the window for viewing the display on the other. Further, by means of the panels 70, the push button 23 integrally formed with the flexible portion 20 will be strengthened in structure.

In conclusion, the flexible probing portion of the clinical thermometer according to the present invention has a strong structure and is firmly engaged with the casing and safe in use. Furthermore, the clinical thermometer is sanitary in use, low in cost, easy to fabricate, simple to process, easy to hold, and appealing in appearance. Hence, this invention is a breakthrough in obviating the drawbacks of the conventional clinical thermometer with a flexible probing portion.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

What is claimed is:

1. An electronic thermometer comprising a casing, an electronic thermometer module mounted in the casing, a metal probe electrically connected to the electronic thermometer module for sensing the body temperature, a flexible covering covered on the casing, the flexible covering having a tapered front portion protruded over the front side of the casing to a distance, and a hard stem is separable from the flexible covering and making a threaded connection between the metal probe and the distal end of the tapered front portion of the flexible covering, the flexible covering comprising a press portion for pressing by a finger to switch on/off the switch of the electronic thermometer module, and a bellows portion extended around the press portion for enabling said press portion to be easily deformed to switch on/off the switch, said casing having a locating flange which is integrally formed with said casing and extended around the periphery near the rear side, and a locating groove extended around the periphery adjacent to the locating flange, a cap having an inside engagement portion fitting the locating flange and locating groove of said casing, said engagement portion being forced over said locating flange into watertight engagement with the locating groove of said casing, said flexible covering extending from the front end to the rear end of said casing and being made integrally, said casing having two embossed portions integrally formed with said casing and symmetrically provided at two sides thereof for resting of fingers to hold the electronic thermometer and for decorating the casing.

2. An electronic thermometer comprising a casing, an electronic thermometer module mounted in said casing, and a metal probe electrically connected to said electronic thermometer module and disposed outside said casing for sensing the body temperature, wherein a flexible covering is covered on said casing, said flexible covering having a tapered front portion protruded over a front side of said casing to a distance; a hard stem is separable from the flexible covering and making a threaded connection between the smallest diameter end of said tapered from portion of said flexible covering and one end of said metal probe, said casing being formed from transparent material; said flexible covering having an opening for viewing a liquid crystal display of said electronic thermometer module, said flexible covering comprising a press portion integral formed with said flexible covering for pressing by a finger to switch on/off switch means of said electronic thermometer module, and a bellows portion extended around said press portion, said flexible covering having embossed portions integrally formed with said flexible covering and symmetrically provided at two opposite lateral sides thereof for the holding of the hand, said hard stem having a threaded neck extended from one end thereof and threaded into said tapered front portion of said flexible covering.

3. The electronic thermometer as claimed in claim 2, wherein said hard stem has a smooth peripheral wall disposed outside said flexible covering and said metal probe.

4. The electronic thermometer as claimed in claim 2, wherein said casing has a rear side remote from the tapered from portion of said flexible covering, and a cap capped on said rear side, said rear side having a locating flange extended around the periphery thereof and a locating groove extended around the periphery adjacent to said locating flange, said cap having an inside engagement portion fitting over said locating flange and forced into engagement with said locating groove.

5. The electronic thermometer as claimed in claim 2, wherein said casing is made of transparent material and said flexible covering on said casing is formed with two recesses, one on the top and the other on the bottom, thereby providing a window for viewing the display, and two panels are forced fitted in said recesses to hold said press portion in position and decreasing said window for viewing the display.

* * * * *